United States Patent
Ray et al.

(10) Patent No.: US 8,441,670 B2
(45) Date of Patent: May 14, 2013

(54) IN-LINE SYSTEM FOR THE VALIDATION OF A PAGE DESCRIPTION LANGUAGE WITHIN A PRINT DATA STREAM

(75) Inventors: Elton T Ray, Livonia, NY (US); David Mensing, Hilton, NY (US)

(73) Assignee: Xerox Corporation, Norwalk, CT (US)

( * ) Notice: Subject to any disclaimer, the term of this patent is extended or adjusted under 35 U.S.C. 154(b) by 629 days.

(21) Appl. No.: 12/753,250

(22) Filed: Apr. 2, 2010

(65) Prior Publication Data

US 2011/0242583 A1    Oct. 6, 2011

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 358/1.18

(58) Field of Classification Search .................. None
See application file for complete search history.

(56) References Cited

U.S. PATENT DOCUMENTS

| | | | |
|---|---|---|---|
| 5,293,466 A | 3/1994 | Bringmann | |
| 5,402,527 A | 3/1995 | Bigby et al. | |
| 5,493,635 A | 2/1996 | Brindle et al. | |
| 5,504,843 A | 4/1996 | Catapano et al. | |
| 5,526,469 A | 6/1996 | Brindle et al. | |
| 5,828,817 A * | 10/1998 | Landau | 358/1.13 |
| 6,373,588 B1 | 4/2002 | Fischer et al. | |
| 6,525,831 B1 | 2/2003 | Evans | |
| 2005/0259295 A1* | 11/2005 | Nagao | 358/2.1 |
| 2010/0157361 A1* | 6/2010 | Ushikubo | 358/1.15 |
| 2012/0293816 A1* | 11/2012 | Bito | 358/1.13 |

* cited by examiner

*Primary Examiner* — Dov Popovici
(74) *Attorney, Agent, or Firm* — Novel IP

(57) ABSTRACT

The present specification discloses a printer in which the printer performs a first analysis of a print job data to identify a page description language and if no page description language is identified by the first analysis, performs additional processing activities, including but not limited to spooling and parsing, concurrent to a second analysis of the entire print job data to identify a page description language.

20 Claims, 9 Drawing Sheets

INTERPRESS XEROX IMG 1000010011101110110
0111011010001011101101000100110101 1
0011010111010011110010100100110101 1
0111011010001001101011011101101 1100

FIG. 4A

10000100111-Tov. Fif. 05- 0111100101001110110 10001
011101 10100-Tov. Fif. 05- 0100110101100110101 11010
0111011010001001101011011101101000 1001101011

FIG. 4B

IN-LINE SYSTEM FOR THE VALIDATION OF A PAGE DESCRIPTION LANGUAGE WITHIN A PRINT DATA STREAM

FIELD

The presently disclosed embodiments are directed to the identification, processing, and/or validation of page description languages (PDLs) in printer systems and, more particularly, to methods and systems for the inline detection of a PDL during, or concurrent with, the execution of a print job by a printer system.

BACKGROUND

A page description language (PDL) is a method of describing printed pages in a printer independent format. A PDL establishes a common interface language between a print driver or client and a print server or printer. A single standard PDL does not presently exist. Accordingly, a number of industry standards have emerged. Currently existing PDL standards include PDF from Adobe, PostScript ("PS"), Hewlett Packard Printer Control Language ("HP-PCL") and Interpress Page Description Language, among others.

Commercially-available PDLs define the construction of various typefaces for characters and numerals. There are other conventions for organizing image data independent of any typefaces therein. These "image formats" include TIFF, CALS, as well as image formats associated with facsimile transmission, such as CCITT fax Group 3 and fax Group 4. Image formats are a system of shorthand commands which enable raw image data, e.g., a set of binary numbers corresponding to black and white pixels, to be compressed into a more manageable form. To take one basic example, an image format such as TIFF or CALS may include an instruction within a data set corresponding to "print a white line" in lieu of a long string of numbers, such as zeros, each number corresponding to one individual pixel in the white line. In this way, image data may be retained in smaller memory spaces than would be required if every single pixel in an image had its own bit of memory. As used herein, the term "image data" shall apply to image data in either image format or PDL, and an "image data set" shall mean a meaningful quantity of such data, such as data for an image or a connected series of images.

With any PDL or image format, there will inevitably be a step of translating the PDL or image format data into a form usable by an output device, such as a printer. Printing hardware requires an input stream of binary data. Thus, the instructions within the image format, such as to "print a white line," will eventually have to be translated into the actual binary code. This code can then be applied to the modulation of a laser source in a raster output scanner, or applied sequentially to individual ejectors in an inkjet printer.

A PDL Guesser is a set of programmatic instructions that determines the page description language (PDL) or Image Format in which a print job is written by analyzing a sample of the data stream received from a data source. The PDL Guesser is essential to an electronic print system since it determines if the system can print a specific job that it receives and, if so, the appropriate format for such job. Once a PDL Guesser in an electronic print system determines the PDL or Image Format of a print job, the print system can print the print job in accordance with the supported PDL or Image Format.

Approaches to determining the PDL or Image Format include looking for specific character strings at the beginning of a very small portion of the image data, as taught in U.S. Pat. No. 5,526,469, commonly assigned as the present application and the disclosure of which is incorporated herein by reference in its entirety. Another PDL guesser searches for a specific command instruction at the beginning of each print job or recognizes unique command instructions, as described in U.S. Pat. No. 5,493,635, commonly assigned as the present application and the disclosure of which is incorporated herein by reference in its entirety. Other guessers recognize a PDL or Image Format by its "signature" string or by the frequency of the occurrence of certain "operators", as explained in U.S. Pat. No. 5,402,527, commonly assigned as the present application and the disclosure of which is incorporated herein by reference in its entirety. Yet another PDL guesser utilizes statistical analysis to recognize a PDL or Image Format, as detailed in U.S. Pat. No. 5,293,466, the disclosure of which is incorporated herein by reference in its entirety. U.S. Pat. No. 6,525,831, disclosure of which is incorporated herein by reference in its entirety, describes a PDL guesser that samples a print job stream, and verifies that in the data sample all command operator strings, their associated parameters and interspersed data are valid for a particular PDL or Image Format.

The aforementioned PDL guessing methods and systems, however, are not sufficient or effective to identify and process for all PDLs and Image Formats. For example, a PDL or Image Format may not have an identified "signature" string present in every print job. Further, there may not be a representative sample of command operators that can be guaranteed to exist in every print job. Similarly, the frequency of occurrence of certain PDL or Image Format command operator strings may not be guaranteed across all print jobs. Still further, the PDL or Image Format may not lend itself to statistical analysis since no characteristic sequences may occur in a significant portion of the print job samples.

Different types of print drivers use different page description languages (PDLs), which are directed to specific printer devices. Devices can therefore easily identify the PDL created by their drivers; however, if the print stream is corrupted or was created using a wrong or unknown print driver, the device may not be able to detect the PDL and it will pass it through as plain text, potentially resulting in reams of illegible text being printed and thus substantial amounts of wasted paper.

There is therefore a need for a method and system that can detect when a PDL has been misidentified by the PDL guesser, and can then accurately identify the intended PDL type of a document to correct the error. Such a method can be used for terminating a job with misidentified PDL before it prints in its entirety, thereby saving resources and energy that would otherwise be wasted.

SUMMARY

The present specification discloses a printer for printing data comprising: a memory and at least one processor executing a plurality of programmatic instructions wherein, upon execution, the programmatic instructions: 1) perform a first analysis of the data to identify a page description language; and 2) if no page description language is identified by the first analysis, perform a plurality of additional processing activities wherein the plurality of additional processing activities includes at least one of activities relevant to printer hardware, such as fusing, fuser preheating, charging, exposing, developing, transferring, or cleaning in xerographic printing; ink or printhead preheating in ink-jet printing; moving of print sheets to one or more predetermined positions; processing of digital image data in any format, such as raster image processing, imposition, decomposition, job assembly, rendering, or memory paging; any print controller operating system tasks; display updates; network-oriented operations, such as status, administration, or data transfer); fax data transfer; job management control functions (adjusting printing resolution); spooling, parsing and/or queuing and wherein said plurality of additional processing activities is performed concurrent with a second analysis of said data to identify and/or validate a page description language.

Optionally, if no page description language is identified by the second analysis, the data is printed as ASCII text. If the page description language is identified by the second analysis, printing of the data is aborted. If the page description language is identified by the first analysis, the second analysis is not performed. The first analysis is performed on a subset of the data. The second analysis is performed on all of the data. The second analysis is performed on the data before said data is converted to binary data. The second analysis is performed on the data before the data is rasterized. The second analysis is performed simultaneously with parsing the data. The second analysis is performed simultaneously with spooling the data.

The present specification also discloses a printer for printing data comprising a memory; and a plurality of processors executing a plurality of programmatic instructions wherein, upon execution, the programmatic instructions: 1) perform a first analysis of said data to identify a page description language; and 2) if no page description language is identified by the first analysis, perform a plurality of additional processing activities wherein the plurality of additional processing activities is performed concurrent with a second analysis of the data to identify a page description language and wherein if the page description language is identified by the first analysis, the second analysis is not performed.

Optionally, if no page description language is identified by the second analysis, the data is printed as ASCII text. If the page description language is identified by the second analysis, printing of the data is aborted. The first analysis is performed on a subset of said data. The second analysis is performed on all of said data. The second analysis is performed on the data before the data is converted to binary data. The second analysis is performed on the data before the data is rasterized. The second analysis is performed simultaneously with parsing the data. The second analysis is performed simultaneously with spooling the data.

The present specification also discloses a printer for printing data comprising: a memory; and a plurality of processors executing a plurality of programmatic instructions wherein, upon execution, the programmatic instructions: 1) perform a first analysis of said data to identify a page description language; 2) if no page description language is identified by the first analysis, perform a plurality of additional processing activities wherein the plurality of additional processing activities includes activities relevant to printer hardware, such as fusing, fuser preheating, charging, exposing, developing, transferring, or cleaning in xerographic printing; ink or printhead preheating in ink-jet printing; moving of print sheets to one or more predetermined positions; processing of digital image data in any format, such as raster image processing, imposition, decomposition, job assembly, rendering, or memory paging; any print controller operating system tasks; display updates; network-oriented operations, such as status, administration, or data transfer); fax data transfer; job management control functions (adjusting printing resolution); spooling, parsing and/or queuing wherein the plurality of additional processing activities is performed concurrent with a second analysis of the data to identify a page description language, and wherein the second analysis is performed on the data before the data is converted to binary data or rasterized, 3) if the page description language is identified by the second analysis, abort the printing of the data; and 4) if no page description language is identified by the second analysis, continue the printing of the data.

These and other embodiments shall be described in the Detail Description in relation to the drawings, as itemized below.

BRIEF DESCRIPTION OF THE DRAWINGS

These and other features and advantages will be appreciated as they become better understood by reference to the following Detailed Description when considered in connection with the accompanying drawings, wherein:

FIG. 4a is a symbolic representation of a data stream with a PDL signature at the beginning of the stream;

FIG. 4b is another symbolic representation of a data stream with a series of operators characteristic of a PDL;

In the figures, the first digit of any three-digit number generally indicates the number of the figure in which the element first appears.

DETAILED DESCRIPTION

In one embodiment, the present system comprises an inline detection system that can identify the intended PDL type of a document using heuristics and search patterns and detect any misidentification of a PDL, or failure to identify a PDL. While conventional PDL guessers analyze only the first few bytes of the data stream, as the data is being read into printer memory, the present system and methods performs an in-line search through the entire data stream. This search operation is conducted in parallel to the activities that a printer is engaged in prior to printing, such as spooling and/or parsing. This enables searching the entire data stream, without being too computationally intensive or causing delay in the printing by an unacceptable amount.

It may be noted that the word "printer" as used herein encompasses any apparatus, such as a digital copier, bookmaking machine, facsimile machine, multi-function machine, etc., which performs a print outputting function for any purpose. It should further be noted that the term processor, as used herein, can comprise software, hardware, or a combination thereof functioning for a predetermined purpose, whereby one processor can operate substantially independently of another processor. Multiple processors can operate on separate or common chips, boards, devices, etc. Furthermore, the term analysis, as used herein, can include any detection operation applied to any image data, or ancillary data, such as headings, associated with image data, that could have a result possibly dispositive of the PDL or other format or nature of the image data. The term concurrent, as used herein, can mean two or more events, actions, or activities whose occurrence at least partially overlaps in time and/or whose occurrence is caused by a substantially common or related event within a larger process.

Figure 1:
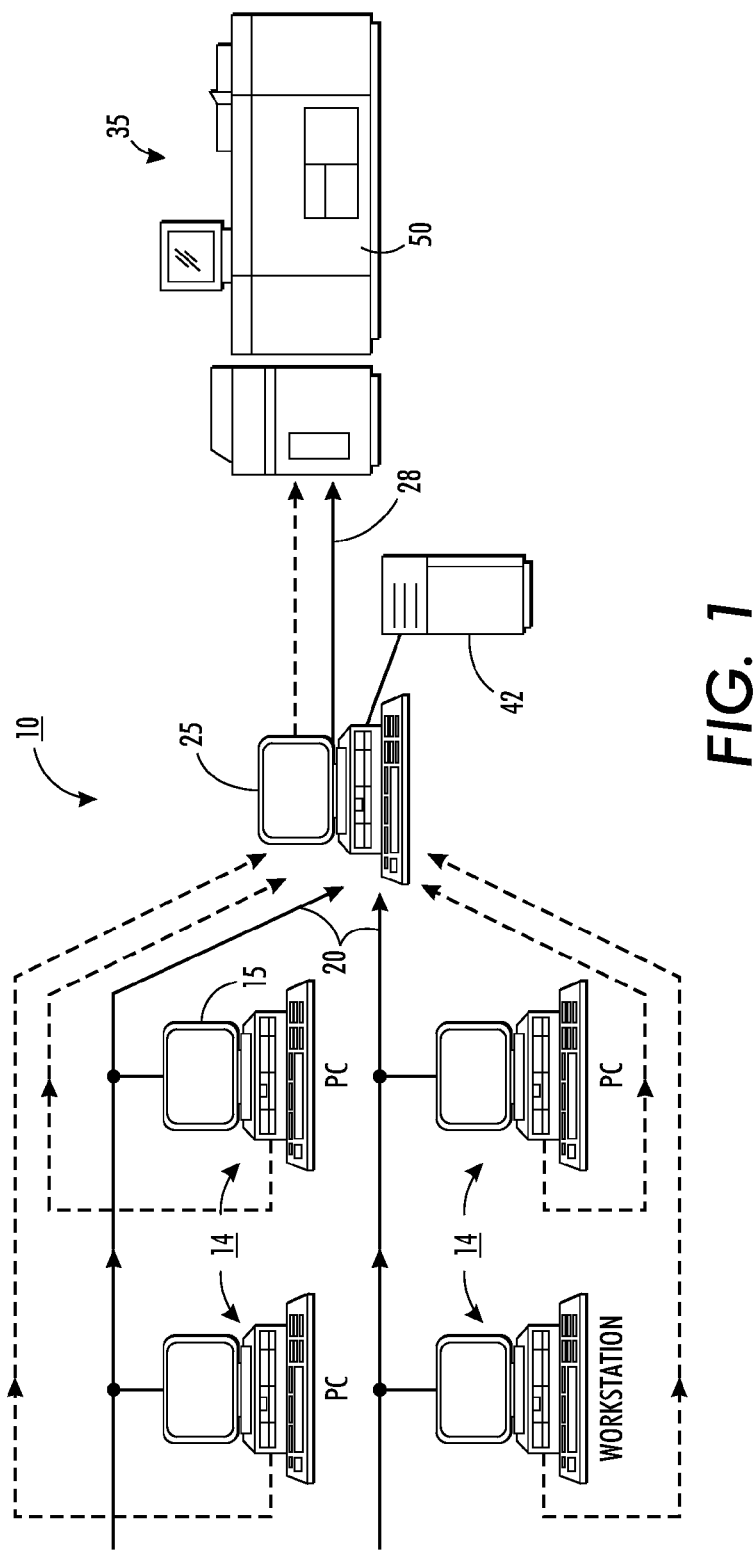
FIG. 1 is a schematic view of a printing system including a plurality of client workstations interfaced with a printer by a print server.

Referring to FIG. 1, a printing arrangement is shown, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

The server 25 comprises any suitable interface for receiving job files from workstations via network 20, with the ability to access and decode the job processing instructions on the accompanying client server job ticket. The server 25 in one embodiment, includes an on-board memory of suitable capacity for temporarily storing the job files pending processing thereof by printing system 35. The print manager on-board memory may be large enough to support long term storage of the job files or parts of the job files. Alternately, one or more remote memories 42 may be provided for this purpose.

The printing system 35 may include one or more high speed electronic printers 50 for processing jobs in accordance with the instructions input through the client server job ticket accompanying each job file. While a single printer 50 is shown, plural printers, either at a single central location or at several remote locations may be envisioned. Printer 50, for example, may be a xerographic based printer, or could comprise other known printer types such as ink jet, laser, ionographic, LED, and the like.

Figure 2:
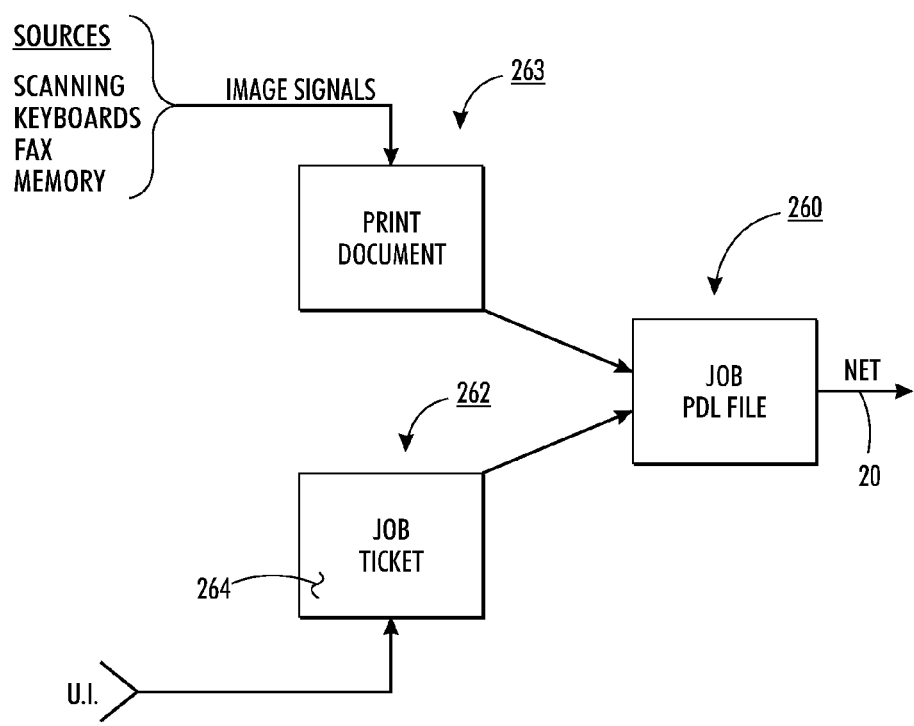
FIG. 2 is a schematic view of a job file and the contents thereof.

Referring to FIG. 2, electronic job files 260, or parts thereof, are created at the individual workstations, each job file being comprised of a Job Specification 262 and Print Data file 263 expressed in a PDL, such as Postscript ("PS") or Hewlett Packard Printer Control Language ("HP-PCL"). Job specification 262 is in the form of a client server job ticket 264 having instructions for routing, handling, and processing the job 262. The jobs in Print Data file 263 are electronic in form, comprising of image signals or pixels generated, for example, by scanning hard copy documents and converting the document images to image signals or pixels, directly by a keyboard, taken from memory, or comprising of page format and/or graphic output commands all encoded in PDL encodings. The content of the job files are normally compressed to increase bandwidth and reduce the amount of storage required. The image signals, pixels or PDL instructions in Print Data File 263 are arranged as electronic documents or pages for printing on a print media such as paper stock or sheets.

The programming instructions in the client server job ticket 264 accompanying the job file 260 may include selection of the printer in the case where more than one printer is available for the client or user to choose from. Where a printing system has printers with different features, functions, speeds, etc., it may be necessary that the client select the printer that is to be used initially so that a client server job ticket 264 with the program selections available with that printer may be displayed at the client's workstation. During the printing process, the server transmits the printing instructions from the client server job ticket 264 to the printing system selected.

Figure 3:
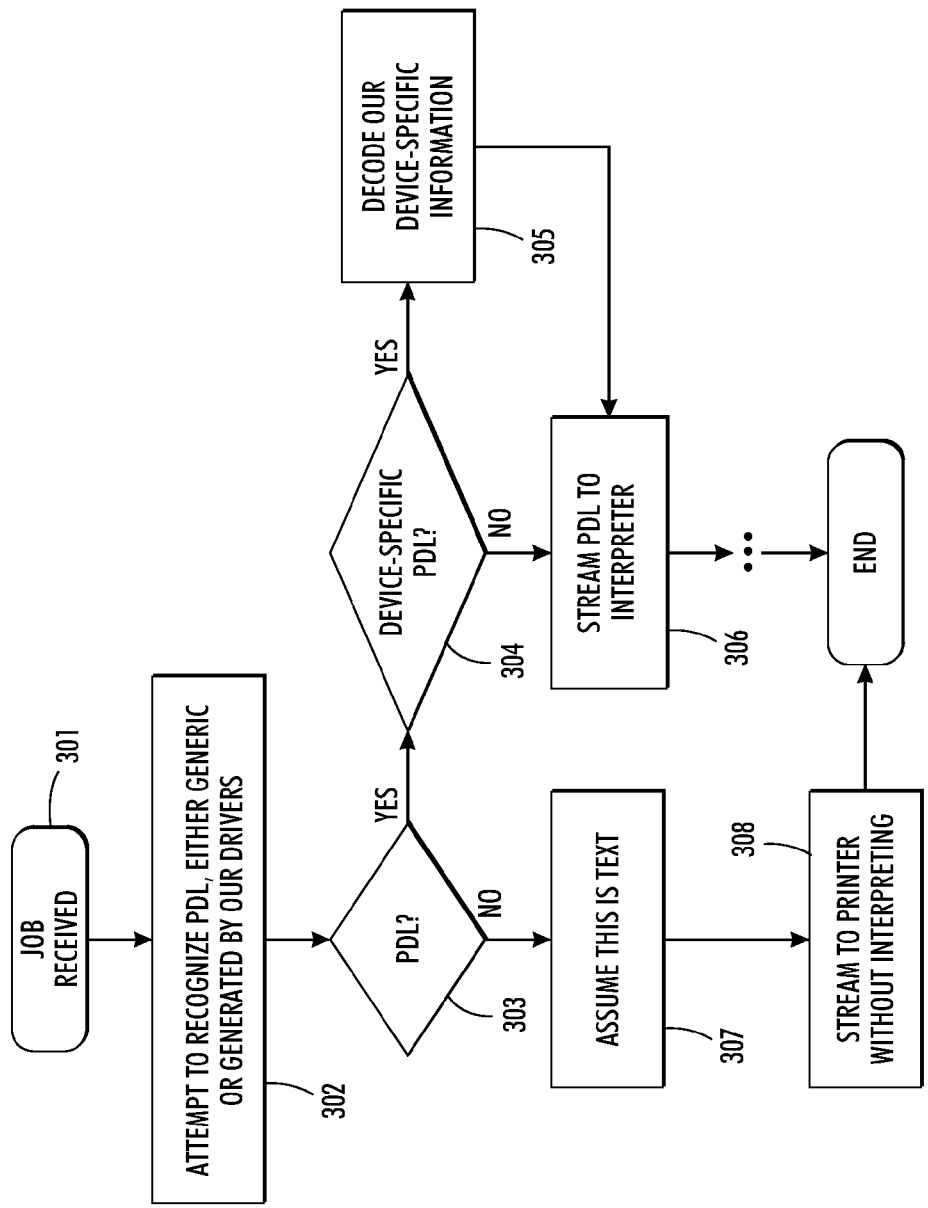
FIG. 3 illustrates, by means of a flowchart, an exemplary workflow of the print logic when it receives a print job.

FIG. 3 illustrates an exemplary workflow of the print logic when the printing system receives a print job. Referring to FIG. 3, in step 301, a print job (in the form of a job file) is received by the print logic. The print logic determines the format and various characteristics such as A4 paper, highlight color, and/or stapled output that are associated with the print job. Each print job assumes the form of a stream, which is streamed into a memory from a data source, such as a network, computer, server, or other device. Further, as described earlier, the job stream is expressed in a PDL, the PDL representing image data and instructions for the print job.

In step 302, the print logic attempts to recognize the PDL using a suitable routine, such as a PDL guesser. The PDL may either be associated with a standard, such as PDF or PS, or generated by the printer driver routine. As is known in the art, a printer driver is a piece of software typically operating within the data source, such as a computer or server, which converts the data to be printed to the form specific to a printer. Different types of print drivers format data using different PDLs. PDLs are therefore tailored to, and specific to, particular printer devices. After attempting to identify a PDL, the print logic then checks if the PDL has been successfully recognized, as shown in step 303. Some PDLs are recognized by their "signatures" while other PDLs are recognized by the frequency of occurrence of certain "operators".

FIG. 4a is a symbolic representation of a data stream 400 with a PDL signature at the beginning of the stream. An example of a PDL characterized by a signature is Interpress. Further, an example of an Interpress signature is a "header" portion, illustrated as 401 in FIG. 4a. The Interpress file is a binary file with a header record that contains the words "INTERPRESS XEROX IMG". The number of character spaces between these words can vary. The number of bytes in the file is typically an integer multiple of 128. FIG. 4b is a symbolic representation of another data stream 410 with a series of operators 421. An example of a PDL characterized by the frequent occurrence of certain operators is Postscript (PS).

Figure 9:
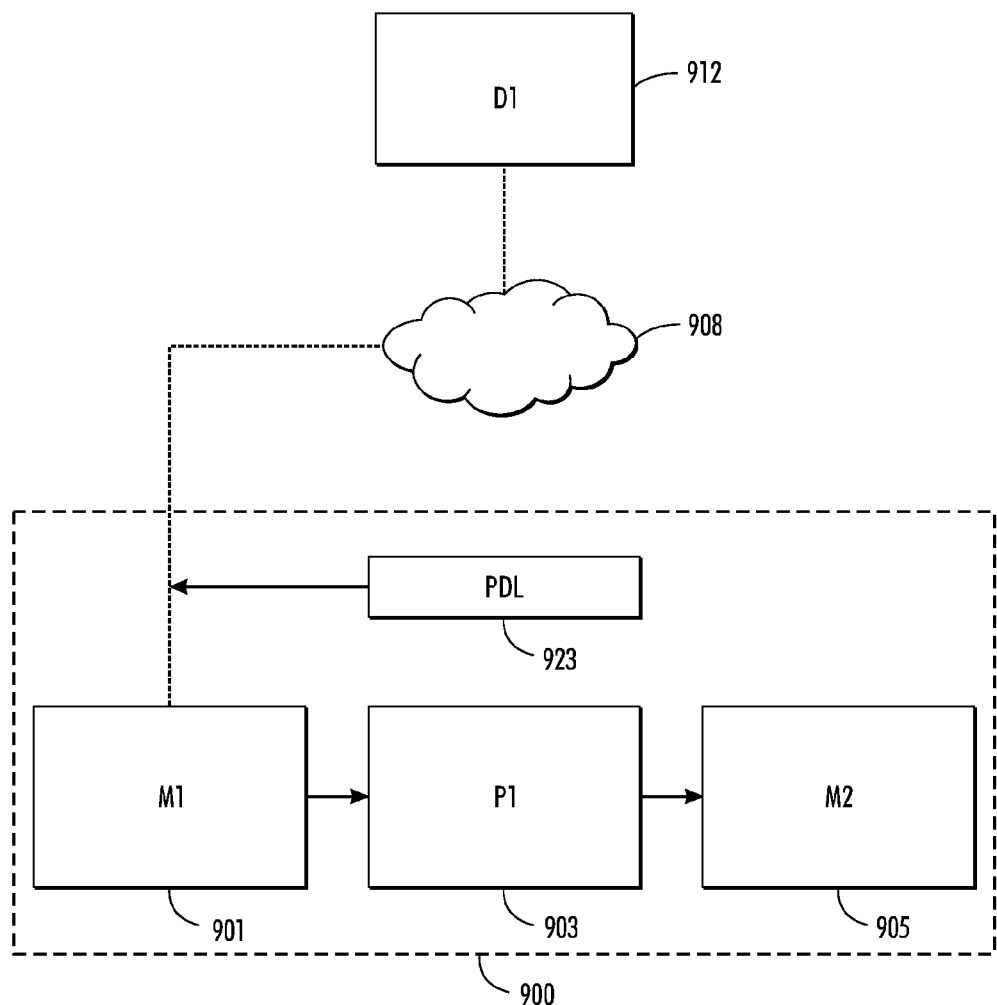
FIG. 9 is a diagram depicting one embodiment of the disclosed print architecture.

The PDL guesser operates on the print data stream as it is being read into printer memory from the original data source. Referring to FIG. 9, a print data stream from a plurality of remote inputs 912, which may be remotely or locally connected via a network 908 to a printing system 900, is read into the printing system's local memory M1 901. As the print data stream is being read into memory M1 901, a conventional PDL guesser 923, executed by a processor, examines the print data stream to identify a PDL associated with the print data stream and thereby determine a format for the requested print job. Because no other printing activity does, or can, occur at this initial data read stage, it is essential that the PDL guesser operate quickly and not unduly delay the requested print job. As a result, the PDL guesser is unable to appropriately or effectively examine the entire print data stream to identify a PDL associated with the print data stream and thereby determine a format for the requested print job.

Referring back to FIG. 3, if a signature or specific operators are determined to be present, implying that a PDL has been successful identified, the print logic then checks if it is a device-specific PDL, in step 304. If the identified PDL is not device-specific, the PDL signature is translated into an information signal and streamed to the interpreter via step 306. If the PDL is identified to be device-specific, the device-specific information is first decoded in step 305, and then the generated information is streamed to the interpreter via step 306.

Alternatively, if the print logic fails to identify a PDL (usually when a signature or series of distinctive operators is not found in the sampled stream of data), an indication that no PDL is available is generated, and the print logic assumes that the data is in the form of ASCII text (plain text), as shown in step 307. In such a case, the data is streamed to the printer without further interpretation, as shown in step 308.

A person of ordinary skill in the art would note that there are different kinds of printer drivers that create many different kinds of printer-specific PDL. Further, different PDLs, or even different brands of the same PDL, may differ in the job ticket. A job ticket, as detailed above with reference to FIG. 2, is the extra data that accompanies the data that is actually printed and carries instructions for routing, handling, and processing the print job. Many printers, including digital front ends (DFEs) and multifunction devices (MFPs), support a plurality of PDLs but also provide a plain text pass-through option for backward compatibility.

While a printer can typically identify common PDLs or PDLs generated by their own drivers, if a print stream is corrupted, was created using the wrong print driver, or is formatted with an unknown PDL, the printer may not be able to detect the PDL type and will process the job as plain text, often yielding a stream of print characters in the form of PDL command strings and other unintelligible characters. The printer then prints these character strings instead of the output represented by them.

Figure 5:
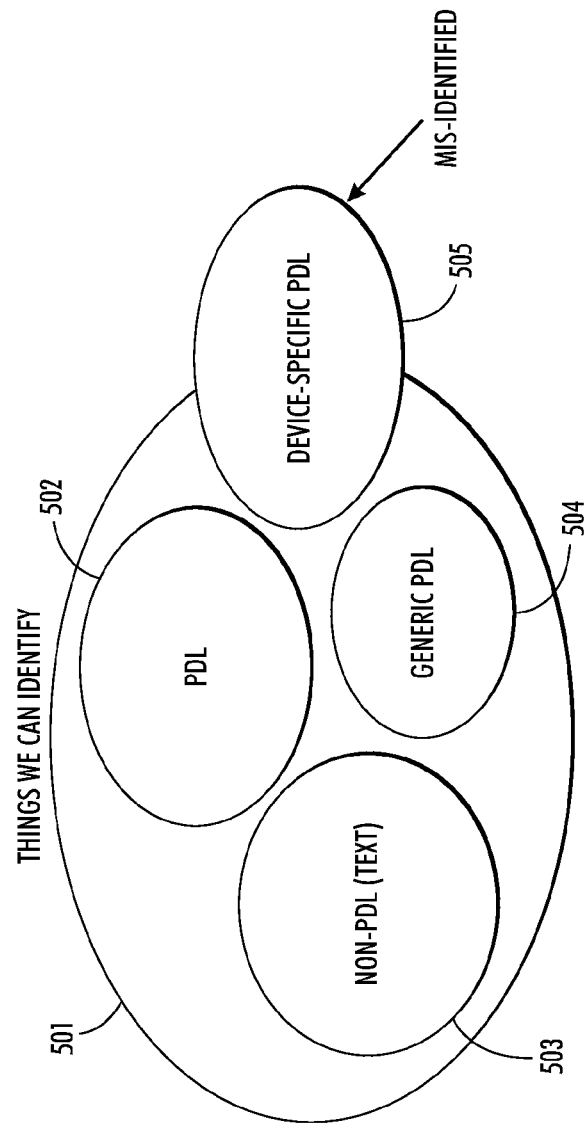
FIG. 5 illustrates using a Venn diagram defining what a PDL guesser routine can accurately detect.

Referring to the diagram of FIG. 5, the circle 501 encompasses the set of items that can be correctly identified by the print logic. This set includes PDL 502, non-PDL (text) 503, and generic PDL 504. Device-specific PDLs 505, however, may or may not be correctly identified. Accordingly, a printer still has the potential of printing reams of unintelligible data strings if it receives a data stream formatted with an unrecognizable device-specific PDL.

In one embodiment, the printer system conducts an in-line evaluation of the data stream, after the initial PDL guesser operation and concurrent to other printing activities, in order to examine the entirety of the data stream for the PDL. Examining substantially all of the data stream for the PDL is an approach which would be too time consuming and processor intensive at the outset of the print job, namely when the data stream is first being received into memory, because no other printer activity can take place until the data is read in and the PDL guesser completes its task. As explained earlier with reference to FIG. 3, after the initial PDL guess, data is sent for further processing (such as decoding or interpreting) if a PDL is identified, or streamed to the printer if data is deemed as text. Therefore, in one aspect, a secondary PDL guesser, check, or validator is placed in-line for data that is deemed as text, after the initial PDL guessing stage. That is, the data stream, which the initial PDL guesser has, by default, assumed to be text, is passed through a secondary PDL check, before being passed on for further processing or streaming. In this manner the entire data stream is searched, while printing or processing activity continues, thereby ensuring that the in-line PDL checker does not unduly slow down or delay the print job.

Accordingly, the disclosed embodiments provide reliable methods and systems to accurately even device-specific PDLs, without adding any significant computational overhead. Searching the print stream inline, in-process, the inline detection routine is added to the printer logic and uses heuristics and search patterns to examine the tokens (specific operators or signatures) in a PDL data stream as a job is being printed. If the in-line PDL validator recognizes one of a group of predefined PDL token patterns in a data stream that had been incorrectly identified as text and was being printed as such, then it instructs the device to terminate printing.

Figure 6:
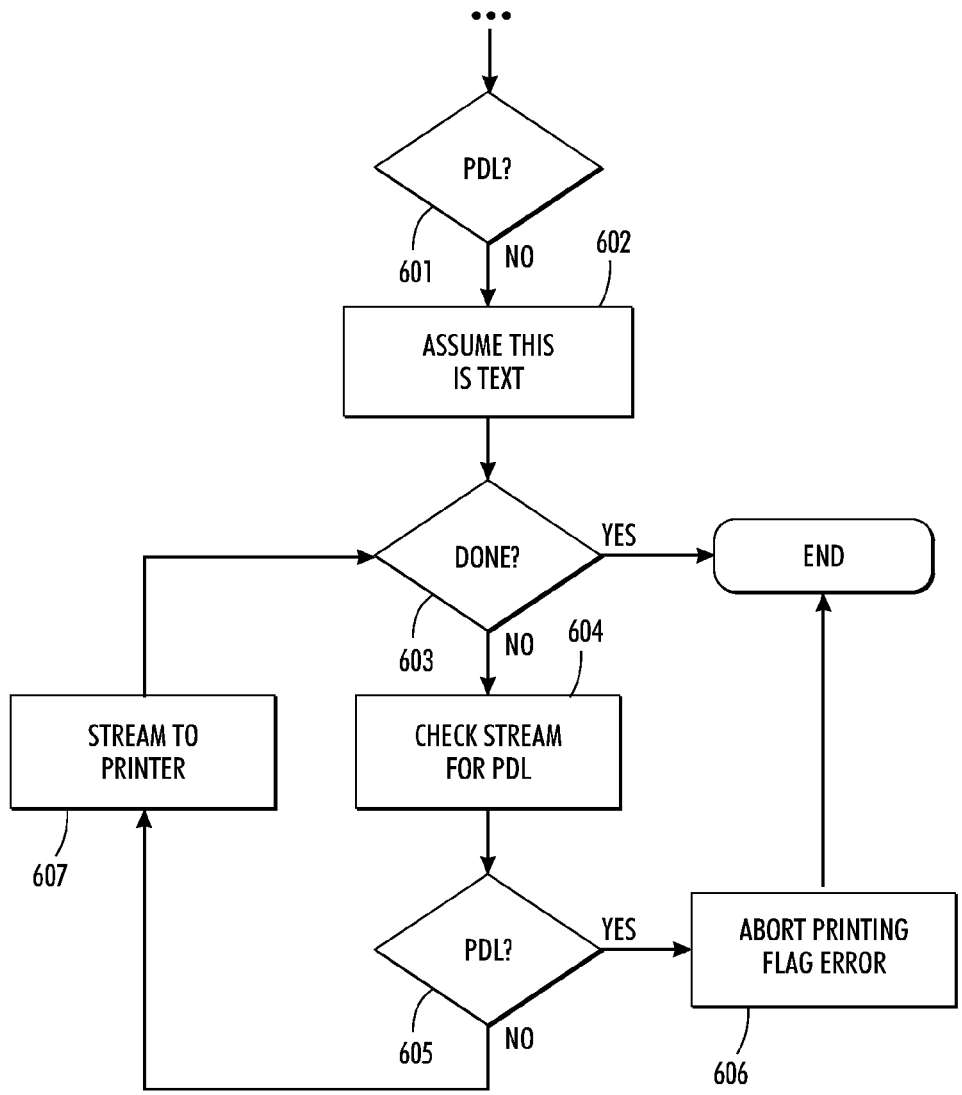
FIG. 6 illustrates an exemplary workflow for PDL detection.

FIG. 6 illustrates the workflow for the PDL detection method and implemented within a printer system. When a print job stream is received by the print logic, the print logic attempts to recognize the PDL using a suitable set of programmatic instructions stored in memory and executed by a local processor, such as a PDL validator. Thereafter, the print logic checks if the PDL has been successfully recognized, as shown in step 601. In case the print logic fails to identify a PDL, it assumes that the data is ASCII text, as shown in step 602. As mentioned earlier (with reference to FIG. 3), in such a case, the data is simply streamed to the printer without further interpretation.

After a stream of data is assumed to be plain text and sent for printing, the print logic checks if it is the end of data stream 603. If data in the print stream has not yet been passed on for rasteurizing, conversion to binary, or otherwise processing in a manner to lose the underlying PDL identifying data, the print logic again checks the incoming data stream for tokens, characters, or other data indicating a PDL, as shown in step 604. If a PDL is identified in step 605, the print logic generates an error signal and aborts printing in step 606. On the other hand, if no PDL is detected, the print data continues to stream to printer, as shown in step 607. Steps 603, 604, 605 and 606 are repeated until all the characters in the print stream are streamed to the printer or until a PDL is identified, whichever is earlier.

Referring to FIG. 9, the print stream data, which was read into printer memory M1 901 and subjected to an initial PDL guesser 923, is then processed, using processor P1 903, for printing. The print stream data, as it is processed for printing, is subjected to a secondary, or in-line, PDL validator. The processed data stream is stored in printer memory M2 905.

In one embodiment, the in-line PDL validator operates on a print data stream concurrent to another printing activity operating on the same print data stream, such activities including activities relevant to printer hardware, such as fusing, fuser preheating, charging, exposing, developing, transferring, or cleaning in xerographic printing; ink or printhead preheating in ink-jet printing; moving of print sheets to one or more predetermined positions; processing of digital image data in any format, such as raster image processing, imposition, decomposition, job assembly, rendering, or memory paging; any print controller operating system tasks; display updates; network-oriented operations, such as status, administration, or data transfer); fax data transfer; job management control functions (adjusting printing resolution); and/or queuing.

More specifically, the in-line PDL validator operates concurrent to a plurality of printing activities. In one embodiment, the in-line PDL validator executes concurrently to a print job management control function that serves to control the output of the print data stream upon which the in-line PDL validator operates, such as establishing, determining, or adjusting printer resolution, notifying and/or addressing a media jam, notifying and/or addressing a pre-processing exception, or notifying and/or addressing a post-processing exception.

In one embodiment, the in-line PDL validator executes concurrently to a queuing function that serves to queue the print data stream upon which the in-line PDL validator operates. In one embodiment, the in-line PDL validator executes concurrently to a parsing activity that serves to parse the print data stream upon which the in-line PDL validator operates. In one embodiment, the in-line PDL validator executes concurrently to a spooling activity that serves to spool the print data stream upon which the in-line PDL validator operates.

In one embodiment, the in-line PDL validator executes concurrently to a marking, fusing, charging, exposing, developing, transferring, or cleaning activity that operates to enable the printing of the print data stream upon which the in-line PDL validator operates. In one embodiment, the in-line PDL validator executes concurrently to a raster image processing, imposition, decomposition, job assembly, rendering, or memory paging activity that operates on the print data stream upon which the in-line PDL validator operates.

In one embodiment, the in-line PDL validator executes concurrently to a print controller operating system task, display update, fax data transfer, or network-oriented operation (such as status, administration, data transfer operations) that operates to enable the printing of the print data stream upon which the in-line PDL validator operates.

It should be appreciated that the in-line PDL validation process can occur on a portion of a print data stream while another portion of the same print data stream is being subjected to a different printing activity. Accordingly, the same portion of the data stream need not be subjected to both an in-line PDL validation analysis at precisely the same time. Rather, one portion of the print data stream can be subjected to an in-line PDL validation analysis while, concurrently, a second portion of the print data stream is subjected to one of the aforementioned printing activities.

Thus, according to one embodiment, a secondary PDL guess, check, or validator is placed in-line to search through the entire data stream concurrent to on-going printer activities. This secondary check is carried out substantially continuously, for substantially each character in the stream, and substantially in parallel as the data is being processed for printing by the printer. In one embodiment, the secondary PDL check is performed on the data stream before the data is converted into binary data, rasterized data, or other data incapable of being searched by the PDL detecting routine.

In one embodiment, PDL detection searches through raw, uninterpreted data stream. In one embodiment, the PDL check routine is placed in parallel to an existing printing activity (such as spooling or parsing) such that the entire print data stream can be searched, without unduly delaying a print job, thereby enabling the PDL detection routine to correctly identify a PDL, even if the PDL-identifying signatures or operators are pushed downstream by a printer driver. Because PDLs, including device-specific PDLs are identified with greater accuracy without causing a material delay in printing activity, paper, time, and energy are saved.

Figure 7:
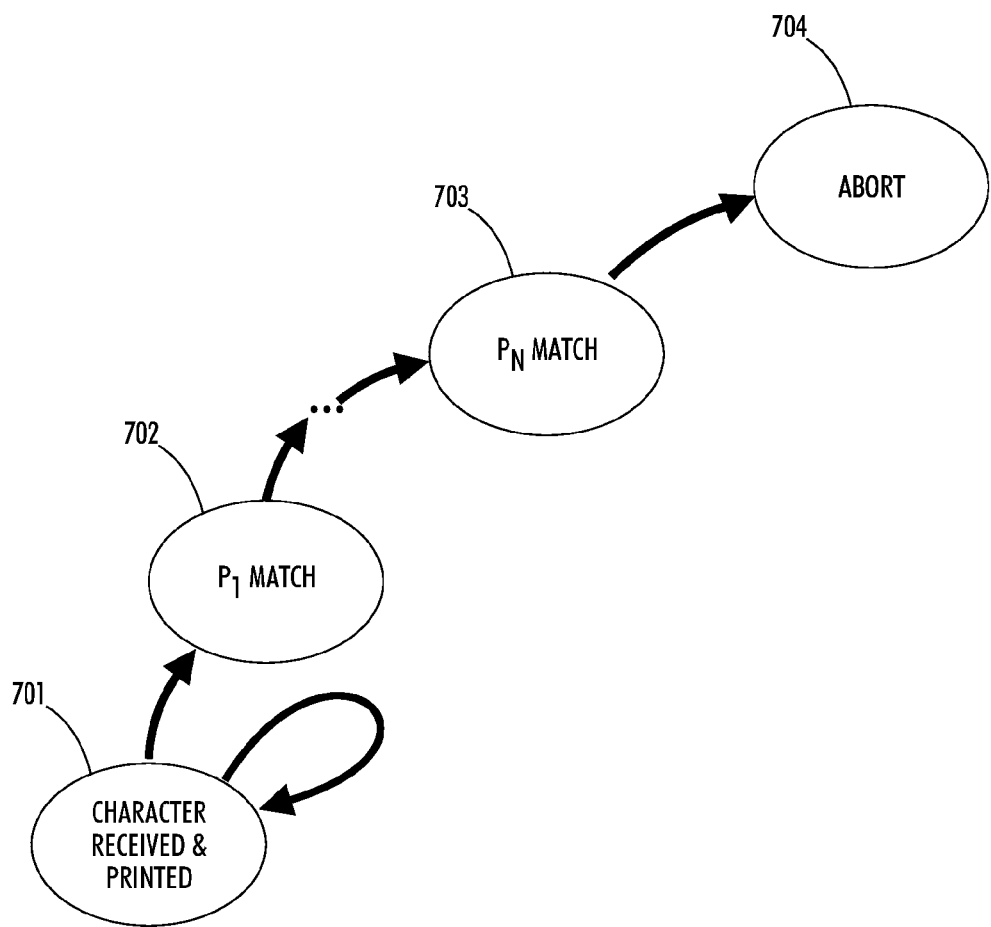
FIG. 7 is a state diagram illustrating an exemplary PDL mapping process that is used to identify a PDL in a given job stream.

For the purposes of PDL validation or detection, a PDL or Image Format is considered to consist of the defined command operator strings and a specified number of parameters associated therewith. The command operator strings are interspersed with data in a print job. FIG. 7 is a state diagram illustrating the PDL mapping process that in one embodiment, is used for identification of PDL in a given job stream.

Referring to FIG. 7, for each character in the stream, the PDL checker attempts to match with a pattern P, the pattern P corresponding to command operator strings that are indicative of PDL in the print job. In one embodiment, P comprises N characters, N being greater than zero. Thus, as the first character is received, as shown in 701, the system attempts to match it against P1, the first character of pattern P, as shown in 702. If P1 is successfully matched, the system receives the next character and attempts to match it with the next character of the pattern, P2. If P1 is not successfully matched, the process receives the next character and attempts to match it again with the first character of the pattern, P1. This process is repeated until the pattern is fully matched up to N characters (703). If, at any point, a character does not match the corresponding pattern, the process receives the next character and attempts to match the pattern again starting with P1. After attempting a match, each character is sent for printing. If the pattern is successfully matched for all the N bits, then PDL is positively identified and printing is aborted, as shown in 704. The entire process (steps 701 through 704) is repeated until all the characters are received or a PDL is found and printing is aborted, whichever occurs first.

One of ordinary skill in the art would appreciate that although the above process has been described with an example of one pattern, any number of patterns may be matched for precise PDL identification. In one embodiment, a single PDL guessing routine is capable of analyzing all the PDL types. Further, the same process could be extended to regular expression comparisons.

In one embodiment, PDL detection is based on a Non-Format Violating Guessing technique, since the detection routine does not violate the PDL or Image Format of the data stream. Non-Format Violating Guessing verifies that in the data sample all command operator strings, their associated parameters and interspersed data are valid for a particular PDL or Image Format. The Non-Format Violating Guessing PDL analyzing routine first identifies all command operator strings for that specific page description language. Next, the set of parameters (if any) are identified for each command operator string. Parameter designators are then assigned by the PDL analyzing routine to characterize the parameters.

Parameter designators can be assigned in several ways. One method is to determine each unique set of parameters for the command operator strings. Two command operator strings are assigned the same parameter designator if they have the same parameters in the exact same order. A second method is to determine how parameters are going to be handled. For instance, if parameters of type text are going to be handled the same as numbers, then one parameter designator can represent both. Another parameter designator could be assigned to handle interspersed data. This second method is useful when the parameters are not actually going to be verified, but must be passed over to get to the next command operator string. At this point, each command operator string has assigned to it a parameter designator which uniquely describes the parameters. The PDL analyzing routine refers to a table which contains each command operator string and its parameter designator for that specific page description language (PDL).

In one embodiment, a handler function or functions is developed for each parameter designator which shall handle the processing of the parameters. The handler may actually verify the validity of each parameter or it may simply skip the parameters.

Figure 8:
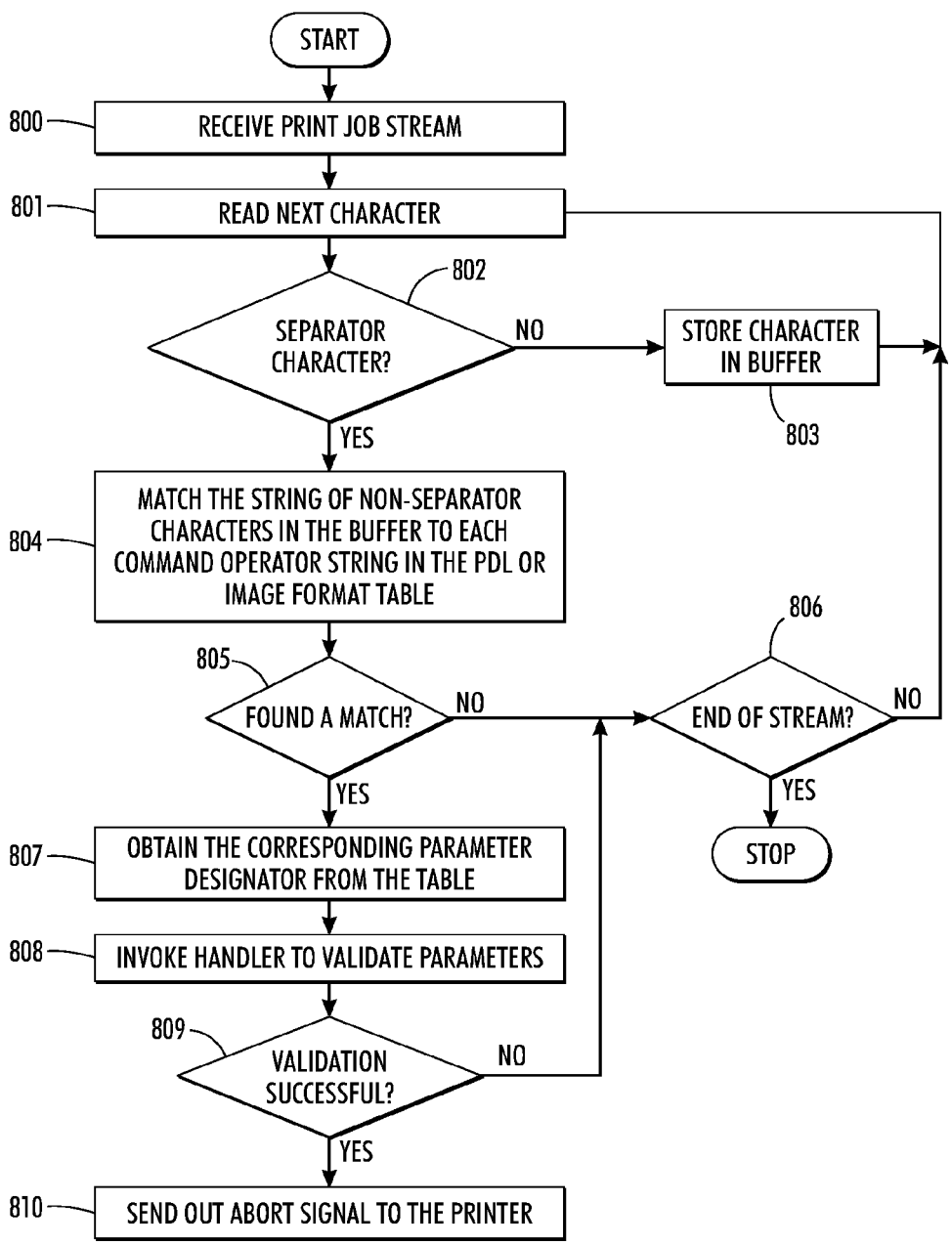
FIG. 8 is a flow chart illustrating the steps in analyzing the print job stream and determining the page description language.

Referring to FIG. 8, a flow chart illustrates an exemplary sequence of steps followed by the PDL analyzing routine. In the initial step 800, the print job stream is communicated to the PDL analyzing routine. In the next step 801, the PDL analyzing routine reads a character from the stream. The PDL analyzing routine then determines whether the character read is a separator character in step 802. A separator character is one that designates the end of a command operator string or parameter in the PDL or Image Format.

If the character read by the PDL analyzing routines is not a separator character, then the character is stored in a buffer in step 803. The buffer holds the other non-separator characters since the last separator character was read. The PDL analyzing routine will then again read the next character from the stream (step 802). If the character read by the PDL analyzing routine is a separator character, the PDL analyzing routine will then match the string of non-separator characters in the buffer to each command operator string in the PDL or Image Format table in the next step 804.

The routine then checks to see if a match is found, in step 805. If the non-separator character string in the buffer does not match any of the command operator strings in the table, then the given character string is not a valid command operator string for the PDL or Image formats in the table for that PDL. The analyzing routine then checks if it has reached the end of stream in step 806. In case it has not reached the end of stream, it continues to read the next character (Step 801).

If, however, the character string from the buffer does match one of the command operator strings in the table, then the character string is a valid command operator string for that specific PDL or Image format. The analyzing routine will then obtain the corresponding parameter designator from the table for that valid command operator string as shown in step 807.

Thereafter, the analyzing routine invokes the handler function in step 808 for the parameter designator obtained in the previous step. The handler verifies the validity of each parameter associated with the parameter designator. The analyzing routine then determines if the handler function has successfully validated the parameters, as shown in step 809.

If the handler function is unable to validate the parameters, then the character string obtained is not a valid command operator string for the PDL or Image format. The analyzing routine then checks if it has reached the end of stream in step 806. In case it has not reached the end of stream, it continues to read the next character (801). If the handler function is able to validate the parameters, then the character string is determined to be a valid command operator string for the PDL or Image format. The analyzing routine in step 810 then sends out an abort signal to the printer, so as to cease printing the job stream wrongly as text.

The above process is repeated and the analyzing routine continues processing the characters until the end of the data.

The system for the inline analysis of the printing stream can be implemented entirely in software. This saves on hardware cost while at the same time keeping the architecture simple. The system provides printers with additional reliability from what a user would perceive as a device failure. It also makes printing devices more environmentally friendly by saving on valuable resources such as paper and energy.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A printer for printing data comprising:
    a. a memory; and
    b. at least one processor executing a plurality of programmatic instructions wherein, upon execution, said programmatic instructions:
        i. perform a first analysis of said data to identify a page description language; and
        ii. if no page description language is identified by said first analysis, perform a plurality of additional processing activities and wherein said plurality of additional processing activities is performed concurrent with a second analysis of said data to identify a page description language.

2. The printer of claim 1 wherein if no page description language is identified by said second analysis, the data is printed as ASCII text.

3. The printer of claim 1 wherein if the page description language is identified by said second analysis, printing of the data is aborted.

4. The printer of claim 1 wherein if the page description language is identified by said first analysis, said second analysis is not performed.

5. The printer of claim 1, wherein said first analysis is performed on a subset of said data.

6. The printer of claim 5, wherein said second analysis is performed on all of said data.

7. The printer of claim 1, wherein said second analysis is performed on said data before said data is converted to binary data.

8. The printer of claim 1, wherein said second analysis is performed on said data before said data is rasterized.

9. The printer of claim 1, wherein said additional processing activities includes at least one of fusing, fuser preheating, charging, exposing, developing, transferring, cleaning, ink preheating, printhead preheating, print sheets moving, digital image data processing, raster image processing, imposition, decomposition, job assembly, rendering, memory paging, controlling printer operating system tasks, updating a display, performing a network oriented operation, transferring fax data, performing job management control functions, spooling, parsing or queuing.

10. The printer of claim 9, wherein said second analysis is performed on a first portion of said data and at least one of said additional processing activities is performed on a second portion of said data.

11. A printer for printing data comprising:
    a. a memory; and
    b. at least one processor executing a plurality of programmatic instructions wherein, upon execution, said programmatic instructions:
        i. perform a first analysis of said data to identify a page description language; and
        ii. if no page description language is identified by said first analysis, perform a plurality of additional processing activities wherein said plurality of additional processing activities is performed concurrent with a second analysis of said data to identify a page description language and wherein if the page description language is identified by said first analysis, said second analysis is not performed.

12. The printer of claim 11 wherein if no page description language is identified by said second analysis, the data is printed as ASCII text.

13. The printer of claim 11 wherein if the page description language is identified by said second analysis, printing of the data is aborted.

14. The printer of claim 11, wherein said first analysis is performed on a subset of said data.

15. The printer of claim 14, wherein said second analysis is performed on all of said data.

16. The printer of claim 11, wherein said second analysis is performed on said data before said data is converted to binary data.

17. The printer of claim 11, wherein said second analysis is performed on said data before said data is rasterized.

18. The printer of claim 11, wherein said additional processing activities includes at least one of fusing, fuser preheating, charging, exposing, developing, transferring, cleaning, ink preheating, printhead preheating, print sheets moving, digital image data processing, raster image processing, imposition, decomposition, job assembly, rendering, memory paging, controlling printer operating system tasks, updating a display, performing a network oriented operation, transferring fax data, performing job management control functions, spooling, parsing or queuing.

19. The printer of claim 18, wherein said second analysis is performed on a first portion of said data and at least one of said additional processing activities is performed on a second portion of said data.

20. A printer for printing data comprising:
   a. a memory; and
   b. at least one processor executing a plurality of programmatic instructions wherein, upon execution, said programmatic instructions:
      i. perform a first analysis of said data to identify a page description language;
      ii. if no page description language is identified by said first analysis, perform a plurality of additional processing activities wherein said plurality of additional processing activities includes at least one of fusing, fuser preheating, charging, exposing, developing, transferring, cleaning, ink preheating, printhead preheating, print sheets moving, digital image data processing, raster image processing, imposition, decomposition, job assembly, rendering, memory paging, controlling printer operating system tasks, updating a display, performing a network oriented operation, transferring fax data, performing job management control functions, spooling, parsing or queuing, wherein said plurality of additional processing activities is performed concurrent with a second analysis of said data to identify a page description language, and wherein the second analysis is performed on said data before the data is converted to binary data or rasterized;
      iii. if the page description language is identified by said second analysis, abort the printing of the data; and
      iv. if no page description language is identified by said second analysis, continue the printing of the data.

* * * * *